United States Patent
Yang et al.

(10) Patent No.: US 9,561,565 B2
(45) Date of Patent: Feb. 7, 2017

(54) APPARATUS FOR AUTOMATIC PLACEMENT OF GASKETS ON A HOUSING

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Liang Zhu, Jiashan (CN); Hai-Dong Song, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 139 days.

(21) Appl. No.: 14/517,191

(22) Filed: Oct. 17, 2014

(65) Prior Publication Data

US 2015/0107100 A1 Apr. 23, 2015

(30) Foreign Application Priority Data

Oct. 23, 2013 (CN) ..................... 2013 2 0653545 U

(51) Int. Cl.
 *B23P 19/00* (2006.01)
 *B23P 19/08* (2006.01)

(52) U.S. Cl.
 CPC ............ *B23P 19/007* (2013.01); *B23P 19/084* (2013.01); *Y10T 29/53539* (2015.01)

(58) Field of Classification Search
 CPC .. B23P 19/007; B23P 19/084; Y10T 29/53539
 See application file for complete search history.

(56) References Cited

U.S. PATENT DOCUMENTS 3,425,687 A * 2/1969 Williams ............... B21D 43/10
 271/265.01

\* cited by examiner

*Primary Examiner* — John C Hong
(74) *Attorney, Agent, or Firm* — Zhigang Ma

(57) ABSTRACT

An apparatus for automatic placement of gaskets on a housing includes a base, the second feeding mechanism, a first detecting member, a bearing mechanism, an assembly mechanism, and a controller. The first detecting member can detect the position of the gaskets relative to the preset position. The detected results are transmitted to the controller by the first detecting member. The controller controls the second feeding mechanism to accurately adjust the position of the gaskets to preset position. Therefore, a projection of the gasket is accurately engaged in a mounting hole of the housing by the assembly mechanism.

16 Claims, 3 Drawing Sheets

APPARATUS FOR AUTOMATIC PLACEMENT OF GASKETS ON A HOUSING

FIELD

The subject matter herein generally relates to assembling apparatus.

BACKGROUND

An assembling apparatus is a commonly used device for assembling a plurality of gaskets on a housing. The assembling apparatus includes a feeding mechanism and an assembly mechanism. The feeding mechanism can retrieve a gasket from a fastening fixture and carry the gasket to the assembly mechanism. The gasket is retrieved again and assembled on the housing by the assembly mechanism. At the same time, the projection of the gasket is engaged in a mounting hole of the housing.

BRIEF DESCRIPTION OF THE RETRIEVEINGS

Implementations of the present technology will now be described, by way of example only, with reference to the attached figures.

DETAILED DESCRIPTION

Figure 1:
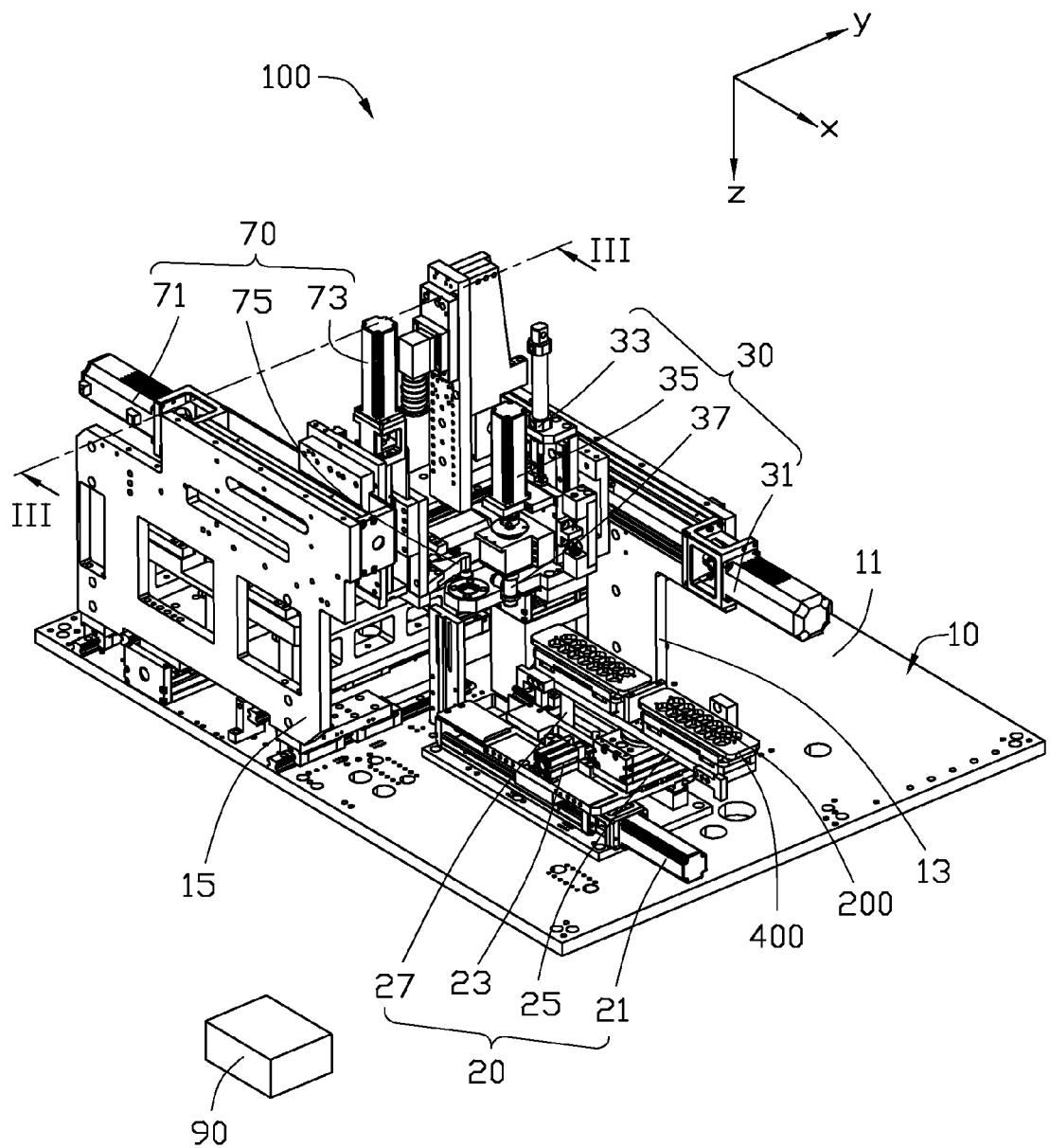
FIG. 1 is an isometric view of an embodiment of an apparatus for automatic placement of gaskets on a housing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an apparatus for automatic placement of gaskets on a housing.

FIG. 1 illustrates an embodiment of an apparatus for automatic placement of gaskets on a housing 100 for assembling a plurality of gaskets 200 on a housing 300 (not shown). The apparatus for automatic placement of gaskets on a housing 100 can include a base 10, a first feeding mechanism 20, a second feeding mechanism 30, an assembly mechanism 70, and a controller 90.

The base 10 can include a main body 11, a first bracket 13, and a second bracket 15 parallel to the first bracket 13. The main body 11 can be substantially rectangular. The first bracket 13 and the second bracket 15 can be positioned on the same side of the main body 11.

The first feeding mechanism 20 can be positioned on the main body 11 and adjacent to the first bracket 13. The first feeding mechanism 20 can include a first linear drive member 21, a drive member 23, a bearing plate 25, and a telescopic rod 27. The first linear drive member 21 can be positioned on the main body 11 parallel to the first bracket 13. The first drive member 23 can be positioned vertically on the first linear drive member 21, and parallel to the main body 11. The bearing plate 25 can be connected to the first drive member 23 for bearing a fastening fixture 400. The fastening fixture 400 can receive a plurality of gaskets 200. The first linear drive member 21 can move the first drive member 23 and the bearing plate 25 along the X coordinate. The first drive member 23 can move the bearing plate 25 along the Y coordinate for carrying the gaskets 200 to the second feeding mechanism 30. The telescopic rod 27 can be positioned on the main body 11, and slide through the bearing plate 25. The telescopic rod 27 can telescopically move relative to the main body 11 for pushing out the gaskets 200 received in the fastening fixture 400.

The second feeding mechanism 30 can be positioned on the first bracket 13, and can include a second linear drive member 31, a second drive member 33, a rotary drive member 35, and a suction member 37. The second linear drive member 31 can be positioned on the first bracket 13 and be located above the first feeding mechanism 20. The second drive member 33 can be positioned vertically on the second linear drive member 31. The rotary drive member 35 can be positioned on the second drive member 33. The suction member 37 can be connected to the rotary drive member 35 and be located above the first feeding mechanism 20. The second linear drive member 31 can move the second drive member 33, the rotary drive member 35 and the suction member 37 along the X coordinate. The second drive member 33 can move the rotary drive member 35 and the suction member 37 along the Z coordinate. The second linear drive member 31 and the second drive member 33 can drive the suction member 37 to retrieve the gaskets 200 and carry the gaskets 200. The rotary drive member 35 can drive the suction member 37 to rotate and position the retrieved gaskets 200.

The assembly mechanism 70 can be positioned on the second bracket 15, and can include a third linear drive member 71, a third drive member 73, and material retrieving member 75. The third linear drive member 71 can be positioned on the second bracket 15 parallel to the first linear drive member 21. The third drive member 73 can be positioned vertically on the third linear drive member 71. The material retrieving member 75 can be connected to the third drive member 73. The third drive member 73 and the material retrieving member 75 can be moved along the X coordinate by the third linear drive member 71. The third drive member 73 can move the material retrieving member 75 along the Z coordinate.

Figure 2:
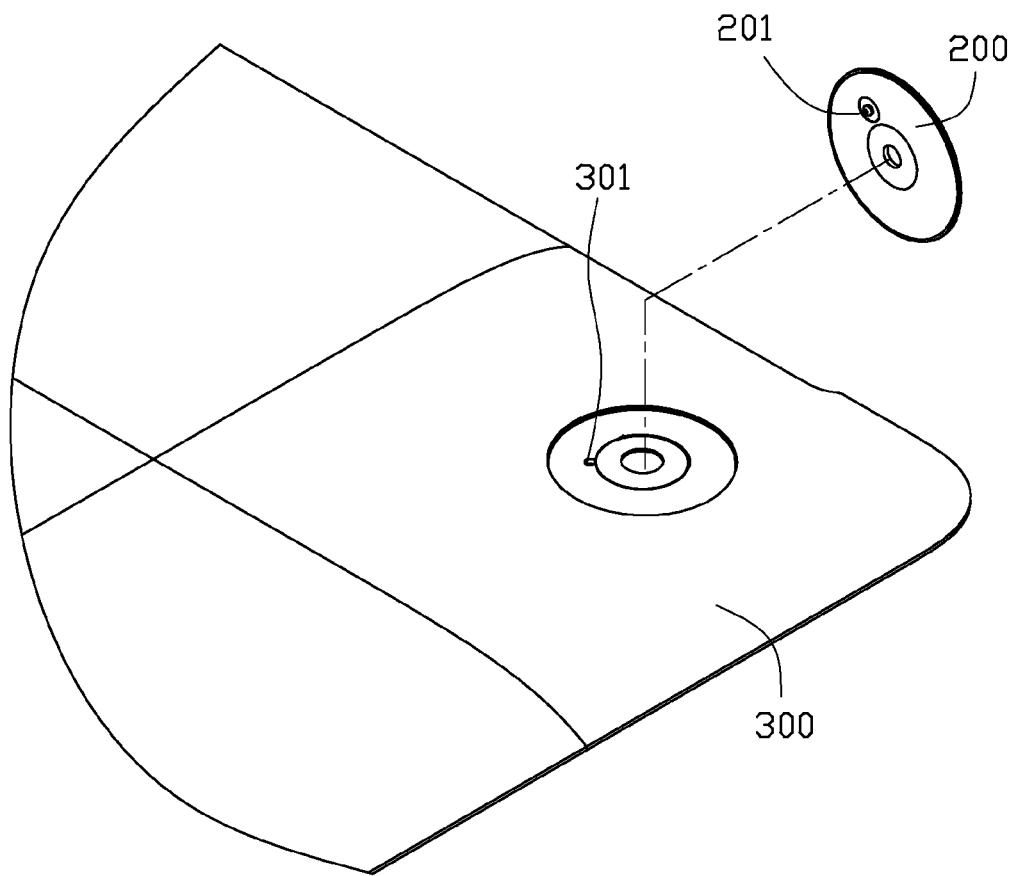
FIG. 2 is a partial, isometric view of the embodiment of a gasket and a housing.

FIG. 2 illustrates that each of the gaskets 200 can include a projection 201 positioned at one side of the gasket 200. The housing 300 can include a mounting hole 301 matching with the projection 201.

Figure 3:
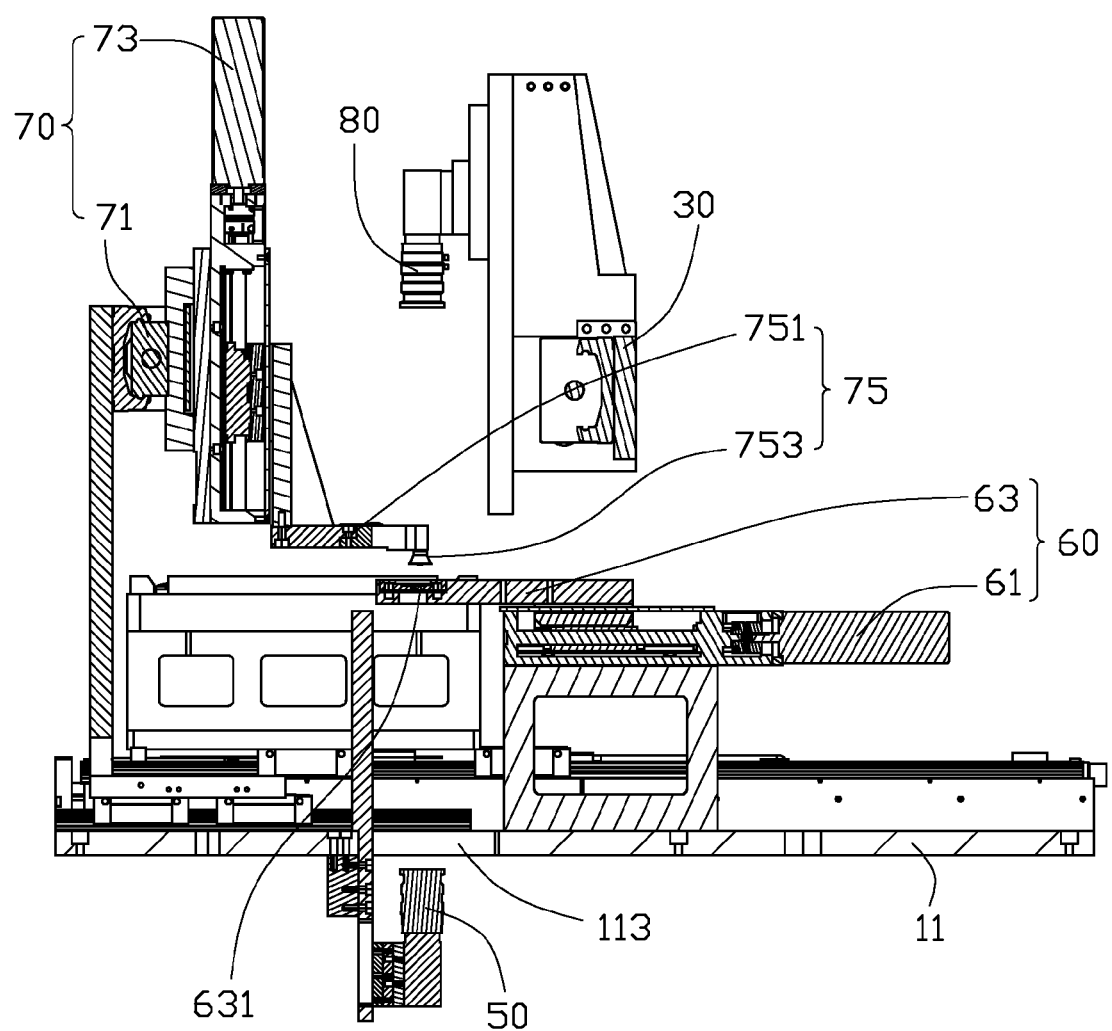
FIG. 3 is a cross-sectional view of the embodiment of an apparatus for automatic placement of gaskets on a housing of FIG. 1 along line III-III.

FIG. 3 illustrates that the apparatus for automatic placement of gaskets on a housing 100 can further include a first detecting member 50, a bearing mechanism 60, and a second detecting member 80. The second feeding mechanism 30, the first detecting member 50, the bearing mechanism 60, the assembly mechanism 70, and the second detecting member 80 can be electrically connected to the controller 90 (shown in FIG. 1).

The main body 11 can include a through-hole 113 located at the center of the main body 11. The first detecting member 50 can be positioned in the through-hole 113. The first detecting member 50 can detect the position of the projection 201 of the gaskets 200 (shown in FIG. 2) relative to the preset position and transmit the detected results to the controller 90 (shown in FIG. 1). The controller 90 can control the suction member 37 to accurately adjust the position of the retrieved gasket 200 (shown in FIG. 1) according to the detected results from the first detecting member 50.

The bearing mechanism 60 can be positioned on the main body 11 and located above the first detecting member 50. The bearing mechanism 60 can be vertical with the first linear drive member 21 (shown in FIG. 1). The bearing mechanism 60 can include a fourth drive member 61 positioned on the main body 11, an adjusting plate 63 connected with the fourth drive member 61. The adjusting plate 63 can include a locating hole 631 located at one end of the adjusting plate 63. The locating hole 631 can receive the gaskets 200 from the second feeding mechanism 30 after adjusting the position of the gaskets 200 (shown in FIG. 1) accurately. The fourth drive member 61 can drive the adjusting plate 63 to retrieve the gaskets 200 to the assembly mechanism 70. Therefore, retrieving the gaskets 200 (shown in FIG. 1) with the assembly mechanism 70.

The material retrieving member 75 can include a connecting portion 751 and a material grabbing portion 753 defined at one end of the connecting portion 751. The connecting portion 751 can be positioned vertically on one side of the third drive member 73 away from the third linear drive member 71, and parallel to the main body 11. The material grabbing portion 753 can be defined vertically extending from the one end of the connecting portion 751 away from the third drive member 73 towards the main body 11. The material retrieving member 75 can retrieve the gaskets 200 from the locating hole 631 and carry the gaskets 200 to the mounting holes 301 of the housing 300 by the cooperation between the third linear drive member 71 and the third drive member 73. Simultaneously, the third drive member 73 can drive the gaskets 200 to be assembled on the housing 300 (shown in FIG. 2).

The second detecting member 80 can be positioned on the first bracket 13 adjacent to one end of the second linear drive member 31 (shown in FIG. 1). The second detecting member 80 can detect the position of the gaskets 200 relative to the housing 300 (shown in FIG. 2), and transmit the detected results to the controller 90. The controller 90 can control the third linear drive member 71 and the third drive member 73 to accurately adjust the position of gaskets 200 relative to the housing 300 (shown in FIG. 2) according to the detected results from the second detecting member 80. In the embodiment, the first detecting member 50 and the second detecting member 80 can be a charged coupled device (CCD).

In operation, the bearing plate 25 can be driven by the first linear drive member 21 and the first drive member 23 to carry the gaskets 200 to the second feeding mechanism 30. The gaskets 200 can be pushed out of the fastening fixture 400 by the telescopic rod 27. The suction member 37 can move to and retrieve one gasket 200. The retrieved gasket 200 can be carried to the first detecting member 50 by the suction member 37. The first detecting member 50 can detect the position of the retrieved gasket 200 relative to the preset position. The detected result can be transmitted to the controller 90 by the first detecting member 50. The controller 90 can control the rotary drive member 35 to adjust the position of the retrieved gasket 200 accurately according to the detected result. After adjusting the position of the retrieved gasket 200 accurately, the retrieved gasket 200 can be received in the locating hole 631 of the bearing plate 60. The received gasket 200 can be carried to the assembly mechanism 70 by the adjusting plate 63. The material retrieving member 75 can retrieve the gasket 200 from the locating hole 631, and carry the retrieved gasket 200 to the housing 300 by the cooperation between the third linear drive member 71 and the third drive member 73. The second detecting member 80 can detect whether the projection 201 of the retrieved gasket 200 can face the mounting hole 301 of the housing 300. The detected result can be transmitted to the controller 90 by the second detecting member 80. The controller 90 can control the third linear drive member 71 and the third drive member 73 to accurately adjust the position of the projection 201 relative to the mounting hole 301 of the housing 300. Finally, the third drive member 73 can drive the projection 201 of the gasket 200 to be engaged in the mounting hole 301 of the housing 300.

As described above, the first detecting member 50 and the second detecting member 80 can detect the position of the gaskets 200. The detected results can be transmitted to the controller 90 by the first detecting member 50 and the second detecting member 80. The controller 90 can control the corresponding rotary drive member 35 and the material retrieving member 70 to accurately adjust the position of the gaskets 200. Therefore, the projections 201 of the gaskets 200 can be engaged accurately in the mounting holes 301 of the housing 300 by the assembly mechanism 70. The efficiency of assembling can be improved.

The second detecting member 80 can be removed, and the position of the gaskets 200 can only be detected by the first detecting member 50. The first feeding mechanism 20 can be removed; the gaskets 200 can be directly carried to the second feeding mechanism 30 by the operators.

The second linear drive member 31 can be removed, the suction member 37 can be directly positioned right above the locating hole 631 of the adjusting plate 63.

The embodiments shown and described above are only examples. Many details are often found in the art such as the other features of an apparatus for automatic placement of gaskets on a housing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An apparatus for automatic placement of gaskets on a housing, the apparatus comprising:

a base;

a second feeding mechanism positioned on the base, the second feeding mechanism having a second drive member connected to a rotary drive member, with a suction member connected to the rotary drive member;

a first detecting member positioned on the base;

a bearing mechanism positioned on the base;

an assembly mechanism; and a controller electrically connected to the second feeding mechanism, the first detecting member, the bearing mechanism and the assembly mechanism;

wherein, the bearing mechanism is positioned closer to the base than the suction member;

wherein, after a gasket is retrieved by the suction member, a position of the retrieved gasket is detected by the first detecting member and transmitted to the controller, the controller then instructs the rotary drive member to adjust the position of the retrieved gasket to a preset position and release the retrieved gasket to the bearing mechanism; and wherein, the assembly mechanism retrieves the released gasket from the bearing mechanism and moves the retrieved gasket from the bearing mechanism to the housing and places the retrieved gasket into a mounting hole on the housing.

2. The apparatus for automatic placement of gaskets on a housing as claimed in claim 1, wherein the apparatus for automatic placement of gaskets on a housing further comprises a second detecting member positioned on the base, the second detecting member is electrically connected to the controller.

3. The apparatus for automatic placement of gaskets on a housing as claimed in claim 2, wherein the second detecting member detects the position of the gasket relative to the housing and transmits the detected result to the controller.

4. The apparatus for automatic placement of gaskets on a housing as claimed in claim 1, wherein the apparatus for automatic placement of gaskets on a housing further comprises a first feeding mechanism, the first feeding mechanism comprises a first linear drive member, a first drive member, and a bearing plate.

5. The apparatus for automatic placement of gaskets on a housing as claimed in claim 4, wherein the first linear drive member is positioned on the base, the first drive member is positioned vertically on the first linear drive member.

6. The apparatus for automatic placement of gaskets on a housing as claimed in claim 4, wherein the bearing plate is connected to the first drive member for bearing the gaskets, and carries the gaskets to the second feeding mechanism by the first linear drive member and the first drive member.

7. The apparatus for automatic placement of gaskets on a housing as claimed in claim 4, wherein the first feeding mechanism further comprises a telescopic rod positioned on the base, the telescopic rod slides through the bearing plate and telescopically moves relative to the base for pushing out the gaskets on the bearing plate.

8. The apparatus for automatic placement of gaskets on a housing as claimed in claim 1, wherein the base comprising a main body, the bearing mechanism comprises a fourth drive member positioned on the main body and an adjusting plate connected to the fourth drive member.

9. The apparatus for automatic placement of gaskets on a housing as claimed in claim 8, wherein the adjusting plate comprises a locating hole located at one end of the adjusting plate, the locating hole locates under the suction member to receive the gaskets.

10. The apparatus for automatic placement of gaskets on a housing as claimed in claim 1, wherein the assembly mechanism comprises a third linear drive member, a third drive member, and a material retrieving member.

11. The apparatus for automatic placement of gaskets on a housing as claimed in claim 10, wherein the third linear drive member is positioned on the base, the third drive member is vertically positioned on the third linear drive member.

12. The apparatus for automatic placement of gaskets on a housing as claimed in claim 10, wherein the material retrieving member is connected to the third drive member, and retrieves the gaskets from the bearing mechanism by the third linear drive member and the third drive member.

13. The apparatus for automatic placement of gaskets on a housing as claimed in claim 10, wherein the material retrieving member comprises a connecting portion and a material grabbing portion defined at one end of the connecting portion.

14. The apparatus for automatic placement of gaskets on a housing as claimed in claim 13, wherein the connecting portion is positioned vertically on one side of the third drive member away from the third linear drive member, the material grabbing portion is defined extending vertically from the one end of the connecting portion away from the third drive member to the base.

15. The apparatus for automatic placement of gaskets on a housing as claimed in claim 1, wherein the base comprises a first bracket and a second bracket parallel to the first bracket, the second feeding mechanism is positioned on the first bracket, the assembly mechanism is positioned on the second bracket.

16. The apparatus for automatic placement of gaskets on a housing as claimed in claim 1, wherein the gasket comprises a projection, the projection is engaged in the mounting hole of the housing.

* * * * *